(12) United States Patent
Poniatowski et al.

(10) Patent No.: US 8,301,648 B2
(45) Date of Patent: Oct. 30, 2012

(54) MULTIMEDIA CONTENT SEARCH AND RECORDING SCHEDULING SYSTEM

(75) Inventors: Robert F. Poniatowski, San Jose, CA (US); Shelly Glennon, San Jose, CA (US); Brian Beach, Columbus, IN (US); Marcel Dubois, San Jose, CA (US)

(73) Assignee: TiVo Inc., Alviso, CA (US)

( * ) Notice: Subject to any disclaimer, the term of this patent is extended or adjusted under 35 U.S.C. 154(b) by 389 days.

(21) Appl. No.: 12/121,557

(22) Filed: May 15, 2008

(65) Prior Publication Data

US 2008/0288460 A1 Nov. 20, 2008

Related U.S. Application Data

(60) Provisional application No. 60/930,419, filed on May 15, 2007.

(51) Int. Cl.
*G06F 17/30* (2006.01)
(52) U.S. Cl. ............ 707/758; 707/628; 707/632; 725/9; 725/38; 725/60; 725/61; 725/86; 386/238; 386/262; 386/291
(58) Field of Classification Search .................... 725/53, 725/58, 9, 38, 60, 61, 86; 705/301; 709/229; 386/238, 262, 291; 707/628, 632, 758, 999.005
See application file for complete search history.

(56) References Cited

U.S. PATENT DOCUMENTS

| | | | |
|---|---|---|---|
| 6,005,565 A | 12/1999 | Legali | |
| 7,747,132 B2 | 6/2010 | Poslinski | |
| 7,890,490 B1 | 2/2011 | Bovenschulte et al. | |
| 2002/0009285 A1 | 1/2002 | Safadi et al. | |
| 2002/0083153 A1 | 6/2002 | Sweatt, III et al. | |
| 2003/0014753 A1 | 1/2003 | Beach et al. | |
| 2003/0028896 A1 | 2/2003 | Swart et al. | |
| 2003/0067554 A1* | 4/2003 | Klarfeld et al. | 348/461 |
| 2004/0013409 A1* | 1/2004 | Beach et al. | 386/83 |

(Continued)

FOREIGN PATENT DOCUMENTS

CN 1513266 A 7/2004

(Continued)

OTHER PUBLICATIONS

TiVo, "2006 Service Update Guide for TiVo Series2 Digital Video Recorders", Jan. 31, 2006, TiVi inc.*

(Continued)

*Primary Examiner* — Dennis Truong
(74) *Attorney, Agent, or Firm* — Hickman Palermo Truong Becker Bingham Wong LLP

(57) ABSTRACT

Techniques described herein enable searching for multimedia content and for downloading or scheduling the recording of the multimedia content. The multimedia content may have been previously stored on one or more databases. The client device may download or schedule the recording of multimedia content in one step, for example, in one touch. When desired multimedia content is not available, the multimedia content is added to the client device's wish list. When the client device's does not have a wish list, the client device's wish list may be created on the spot. During the scheduling of the recording, a tag associated with the multimedia content is checked to determine whether the multimedia content is live or delayed. When the tag indicates the multimedia content is live or delayed, the client device prompts with a suggestion to add extra time to the end of the recording of the multimedia content.

44 Claims, 17 Drawing Sheets

U.S. PATENT DOCUMENTS

| | | | |
|---|---|---|---|
| 2004/0024886 A1 | 2/2004 | Saxena | |
| 2004/0078816 A1 | 4/2004 | Johnson | |
| 2004/0158856 A1 | 8/2004 | Grooters et al. | |
| 2004/0187164 A1* | 9/2004 | Kandasamy et al. | 725/132 |
| 2004/0194141 A1* | 9/2004 | Sanders | 725/53 |
| 2005/0204385 A1 | 9/2005 | Sull et al. | |
| 2006/0015580 A1 | 1/2006 | Gabriel | |
| 2006/0146436 A1 | 7/2006 | Goodwin et al. | |
| 2007/0100799 A1 | 5/2007 | Rose et al. | |
| 2007/0174471 A1* | 7/2007 | Van Rossum | 709/229 |
| 2007/0204299 A1* | 8/2007 | Vosseller | 725/46 |
| 2007/0212025 A1 | 9/2007 | Barton | |
| 2007/0214488 A1* | 9/2007 | Nguyen et al. | 725/134 |
| 2007/0219856 A1* | 9/2007 | Ahmad-Taylor | 705/14 |
| 2007/0223870 A1* | 9/2007 | Farling et al. | 386/46 |
| 2008/0115168 A1* | 5/2008 | Adwankar et al. | 725/46 |
| 2008/0168503 A1* | 7/2008 | Sparrell | 725/58 |
| 2008/0172362 A1 | 7/2008 | Shacham | |
| 2008/0249991 A1 | 10/2008 | Valz | |
| 2008/0288461 A1 | 11/2008 | Glennon et al. | |
| 2010/0186038 A1 | 7/2010 | Thomas et al. | |

FOREIGN PATENT DOCUMENTS

| | | |
|---|---|---|
| CN | 1529504 | 9/2004 |
| JP | 2004524163 A | 9/2004 |
| JP | 2006-309364 | 11/2006 |
| WO | WO 01/46843 A2 | 6/2001 |
| WO | WO 01/80079 A2 | 10/2001 |
| WO | WO 02/069629 A2 | 9/2002 |
| WO | WO 2005/101411 A2 | 10/2005 |

OTHER PUBLICATIONS

WIPO; http://www.wipo.int/patentscope/search/en/detail.jsf?docId=WO2001037465&recNum=1&maxRec=&office=&prevFilter=&sortOption=&queryString=&tab=PCTDescription#; May 25, 2001.*

International Searching Authority, "International Search Report", PCT/US08/63787, dated Aug. 20, 2008, 3 pages.

Claims, PCT/US08/63787, 11 pages.

Reti et al., "DiMaS: distributing multimedia on peer-to-peer file sharing networks", In proceedings of the 12th annual ACM international conference of multimedia, published Oct. 10, 2004, 2 pages.

International Searching Authority, "International Search Report", PCT/US08/63805, dated Aug. 15, 2008, 12 pages.

Claims, PCT/US08/63805, 14 pages.

Application No. 2008254906, Australian Patent Office, "Examination Report" Issued May 31, 2010, 2 pages.

Current Claims of Application No. 2008254906, 10 pages.

Application No. 2008254894, Australian Patent Office, "Examination Report" Issued Jul. 19, 2010, 2 pages.

Current Claims of Application No. 2008254894, 8 pages.

Singapore Application No. 200907460-0, Australian Patent Office, "Written Opinion" issued Nov. 29, 2010, 8 pages.

Current claims of Singapore Application No. 200907460-0, 11 pages.

European Patent Office, "International Search Report", Application No. 08755620.5, PCT US2008063805, Applicant Tivo Inc., dated Feb. 2, 2011, 6 pages.

Current claims, application No. 08755620.5, applicant Tivo Inc., 5 pages.

Intellectual Property Office of Singapore, Office Action and Written Opinion, Application No. 200907481-6, Applicant: Tivo, Inc. Dated Jan. 12, 2011, 8 pages.

Current Claims, Applicant: Tivo, Inc., Application No. 200907481-6, 14 pages.

U.S. Appl. No. 12/121,672, filed May 15, 2008, Final Office Action, Mailing Date May 24, 2011.

U.S. Appl. No. 12/121,688, filed May 15, 2008, Office Action, Mailing Date Mar. 2, 2012.

Canadian Intellectual Property Office, "Office Action", in application No. 2,683,192, dated Mar. 6, 2012, 3 pages.

Current Claims in application No. 2,683,192, dated Mar. 2012, 14 pages.

The Japan Patent Office, "Notification of Reasons for Rejection", in application No. 2010-508597, dated May 15, 2012, 4 pages.

Current Claims in Application No. 2010-508597 dated May 2012, 16 pages.

U.S. Appl. No. 12/121,688, filed May 15, 2008, Final Office Action, Mailing Date Jun. 7, 2011.

U.S. Appl. No. 12/121,619, filed May 15, 2008, Final Office Action, Mailing Date May 26, 2011.

U.S. Appl. No. 12/121,619, filed May 15, 2008, Advisory Action, Mailing Date Jul. 18, 2011.

The State Intellectual Property Office of the People'S Republic of China, "Notification of First Office Action", Application No. 200880016119.0, dated Jun. 24, 2011, 5 pages.

Current Claims in China Office Action Application No. 200880016119, dated Jun. 2011, 14 pgs.

Intellectual Property Office of Singapore, "Examination Report" in Application No. 200907481-6, dated Jul. 21, 2011, 6 pages.

Current Claims in Application No. 200907481-6, dated Jul. 2011, 15 pages.

State Intellectual Property Office of the People'S Republic of China, "First Office Action" in Chinese Patent Application No. 200880016267.2 English Translation, Applicant: TiVo Inc., Dated Apr. 29, 2011, 12 pages.

Current Claims, Chinese Patent Application No. 200880016267.2, Applicant: TiVo Inc., dated Apr. 2011, 11 pages.

European Patent Office, Search Report and Written Opinion, Application No. 08755604.9-2223/2156330, Applicant: TiVo Inc., Dated May 11, 2011, 7 pages.

Current Claims, 08755604.9-2223/2156330, Applicant: TiVo Inc., dated May 2011, 5 pages.

U.S. Appl. No. 12/212,619, filed May 15, 2008, Office Action, Mailing Date Dec. 7, 2010.

U.S. Appl. No. 12/121,672, filed May 15, 2008, Non-Final Office Action, Mailing Date Nov. 10, 2010.

U.S. Appl. No. 12/121,688, filed May 15, 2008, Non-Final Office Action, Mailing Date Jan. 5, 2011.

U.S. Appl. No. 12/121,688, filed May 15, 2008, Advisory Action, Mailing Date Aug. 25, 2011.

U.S. Appl. No. 12/121,672, filed May 15, 2005, Office Action, Mailing Date Nov. 1, 2011.

U.S. Appl. No. 12/121,672, filed May 15, 2008.

* cited by examiner

Program  500

How I Met Your Mother

"Swarley" (2006) When the gang views a tape from Barney's ex-girlfriend, everyone must share their most embarrassing moment in order to get him to tell the full story about the tape. HDTV, CC, Repeat.

(Swivel Search)  501

View upcoming episodes

Modify this Season Pass

Save to VCR

Add to KidZone

Play

Keep until....

Delete now

If you like this....

More options

FIG. 6

How I Met Your Mother <u>600</u>
Series

Comedy, Sitcom (2005 - Current)
Wednesday 8:00 pm ABC
TV-PG

<u>601</u>

Upcoming Showings    <u>603</u>

Available Downloads    <u>604</u>

If You Like This....

Starring:
  Neil Patrick Harris
  Jason Segel    <u>602</u>
  Josh Radner
  Cobie Smulders
  Alyson Hannigan Guest Starring:

*A love story in reverse. Egged on by his best friend's upcoming nuptials, Ted (Radnor) believes he finds the woman of his dreams in Robin (Smulders) -- though destiny might have something different in mind.*

Episode Guide

Record this program

Press  to start a new search

FIG. 7
How I Met Your Mother 700
Series
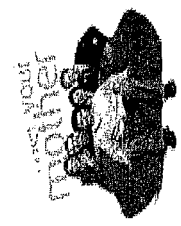
Program Synopsis
There are 6 upcoming showings.
Available Downloads
If You Like This....
701
| | | | |
|---|---|---|---|
| Mon 12/18 | 8:00 pm | 5 | KPIX |
| Mon 12/18 | 8:00 pm | 5-1 | KPIXDT |
| Wed 12/20 | 8:30 pm | 5 | KPIX |
| Wed 12/20 | 8:30 pm | 5-1 | KPIXDT |
| Mon 12/25 | 8:00 pm | 5 | KPIX |
| Mon 12/25 | 8:00 pm | 5-1 | KPIXDT |
Starring:
  Neil Patrick Harris
  Jason Segel
  Josh Radner
  Cobie Smulders
  Alyson Hannigan
Guest Starring:
Press  to start a new search FIG. 8
How I Met Your Mother 800
Series
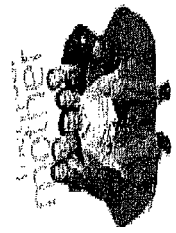
Program Synopsis
Upcoming Showings
If You Like This....
Starring:
 Neil Patrick Harris
 Jason Segel
 Josh Radner
 Cobie Smulders
 Alyson Hannigan
Guest Starring:
There are 24 available episodes.
801
802  Pilot
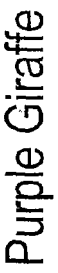 Purple Giraffe
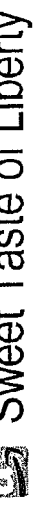 Sweet Taste of Liberty
 Return of the Shirt
 Okay Awesome
The Slutty Pumpkin
Matchmaker
Press  to start a new search

FIG. 9

How I Met Your Mother 900

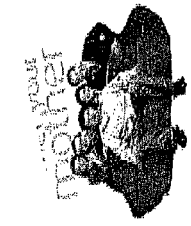

Series

Comedy, Sitcom (2005 - Current)
Wednesday 8:00 pm ABC
TV-PG       901

Program Synopsis
Upcoming Showings
Available Downloads
If You Like This....
Starring:
  Neil Patrick Harris
  Jason Segel
  Josh Radner
  Cobie Smulders
  Alyson Hannigan
Guest Starring:

A love story in reverse. Egged on by his best friend's upcoming nuptials, Ted (Radnor) believes he finds the woman of his dreams in Robin (Smulders) -- though destiny might have something different in mind.

Record this program

Press ⊙ to start a new search

FIG. 10
How I Met Your Mother 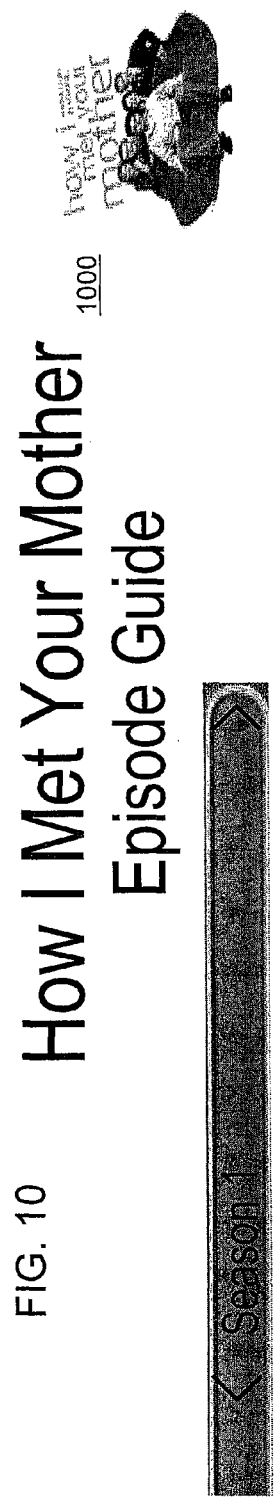
Episode Guide
1000
Season 1
1001
Season 2
Season 3
Season 4
There are 24 episodes in Season 1.
Pilot
Purple Giraffe
1002   Sweet Taste of Liberty
Return of the Shirt
Okay Awesome
The Slutty Pumpkin
Matchmaker
Press  to start a new search FIG. 11
Doogie Howser Series 1100
Mitchell Anderson
Andrew Bilgore
Peter Riga 1102
There are 3 upcoming programs or available downloads tagged with this keyword.
Tags: 1101
Coming of Age 1103
Doctor
Medical
Prodigy 1104
E.R.
Grey's Anatomy
Scrubs
Press ⊙ to start a new search

FIG. 14

Program

Doogie Howser
"The Ice Queen Cometh" (1989) Victoria Burke, the hospital's attractive new chief of radiology, wants some of Doogie's genius genes. CC, Repeat.

Mon 11/18 5:00 pm 42 USAP
Duration 0:30
Rated TV-PG
Comedy
Press INFO for details (Options)

1402 Record this episode
Get a Season Pass
View upcoming episodes
Don't do anything

FIG. 15

Doogie Howser Series

Comedy, Sitcom (2005 - Current)
Wednesday 8:00 pm ABC
TV-PG

Program Synopsis
Upcoming Showings
If You Like This....
Starring:
 Neil Patrick Harris
 Max Casella
 Lawrence Pressman
 James Sikking
 Belinda Montgomery
Guest Starring:
 Courtney Cox

*A love story in reverse. Egged on by his best friend's upcoming nuptials, Ted (Radnor) believes he finds the woman of his dreams in Robin (Smulders) -- though destiny might have something different in mind.*

Episode Guide
Record this program — 1502

Press ⊙ to start a new search

FIG. 16

How I Met Your Mother Episode

Episode Synopsis
Upcoming Showings
Available Downloads

Season 1, Episode 1
September 1, 2005

Starring:
  Neil Patrick Harris
  Jason Segel
  Josh Radner
  Cobie Smulders
  Alyson Hannigan
Guest Starring:
  Courteney Cox It's the year 2030 and an older Ted Mosby is telling the story to his son and daughter about how he met and will eventually marry their mother. This is where we meet for the first time Ted, Lily Marshall, Barney and Robin.

Go back to Series
Create a WishList for this episode —— 1602

Press ⓖ to start a new search

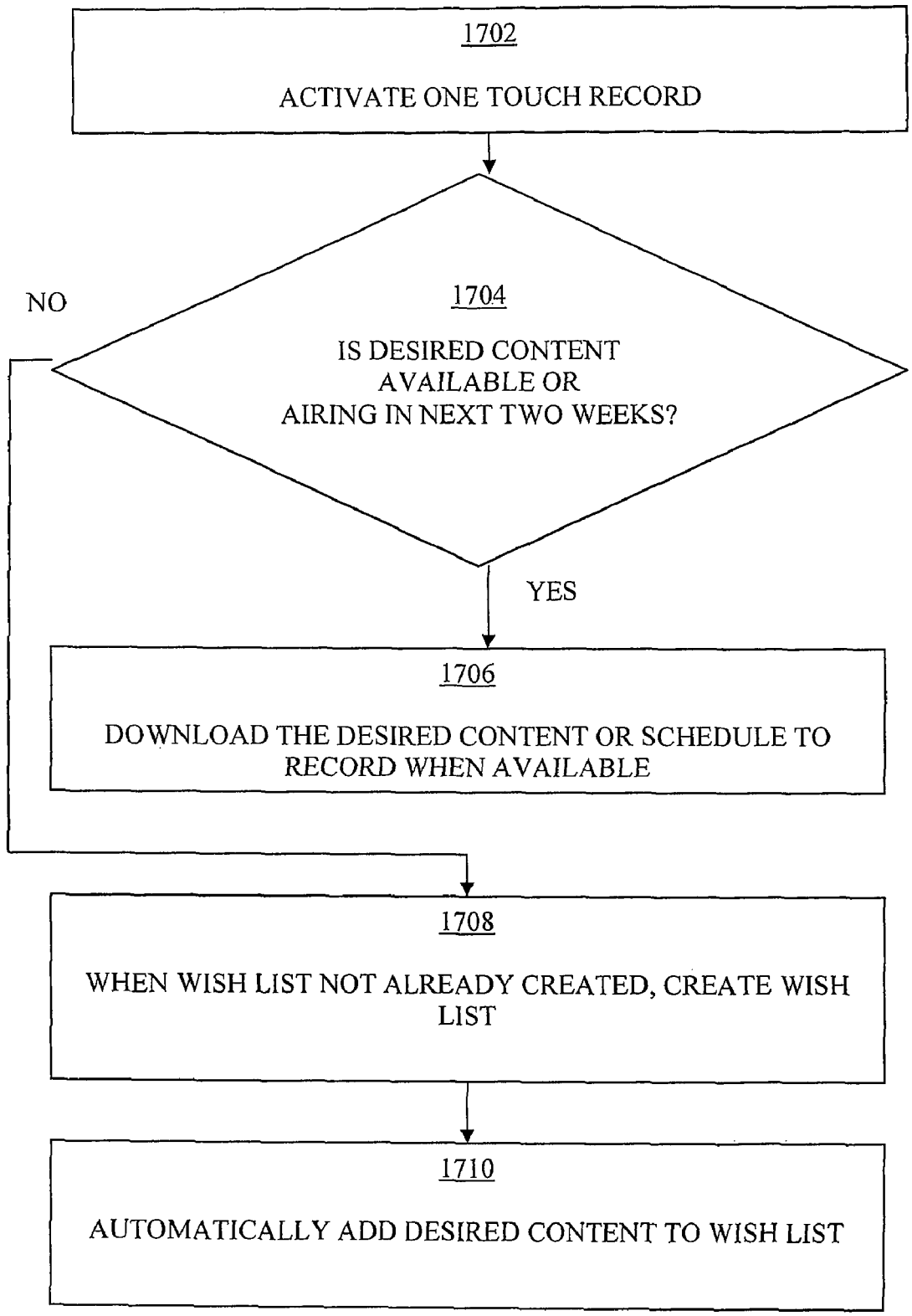

MULTIMEDIA CONTENT SEARCH AND RECORDING SCHEDULING SYSTEM

CLAIM OF PRIORITY AND CROSS REFERENCE TO RELATED APPLICATIONS

This application claims benefit of U.S. patent application Ser. No. 60/930,419, filed May 15, 2007, entitled "Multi-Level Media Content Search And Recording System", the entire contents of which are incorporated by reference as if fully set forth herein.

This application is related to U.S. patent application Ser. No. 12/121,629, entitled, "Program Data Progressive Search System," filed May 15, 2008, U.S. patent application Ser. No. 12/121,672, entitled, "Multimedia Content Search System," filed May 15, 2008, and U.S. patent application Ser. No. 12/121,688, entitled, "Multimedia Content Search System with Source and Field Differentiation," filed May 15, 2008, each of which is owned by Applicant and is incorporated herein in its entirety by this reference thereto.

FIELD OF THE INVENTION

The present invention relates to digital video recorders ("DVRs"). The invention relates more specifically to a multimedia content search and recording scheduling system for DVRs.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way users watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates an example of a user interface screen that displays a program synopsis and user-selectable search terms according to an embodiment of the invention;

FIG. 7 illustrates an example of a user interface screen that displays upcoming program listings and user-selectable search terms according to an embodiment of the invention;

FIG. 8 illustrates an example of a user interface screen that displays downloadable content listings and user-selectable search terms according to an embodiment of the invention;

FIG. 9 illustrates an example of a user interface screen that displays a program synopsis and a user-selectable episode guide according to an embodiment of the invention;

FIG. 10 illustrates an example of a user interface screen that displays an episode guide according to an embodiment of the invention;

FIG. 11 illustrates an example of a user interface screen that displays user-selectable tags according to an embodiment of the invention;

FIG. 14 is a screen shot showing a one touch record link according to one embodiment;

FIG. 15 is a screen shot showing a one touch record link according to one embodiment;

FIG. 16 is a screen shot showing a Create a WishList for this episode link according to one embodiment; and FIG. 17 is a flow diagram that illustrates a one touch record and wish list process according to one embodiment.

DETAILED DESCRIPTION

Figure 1:
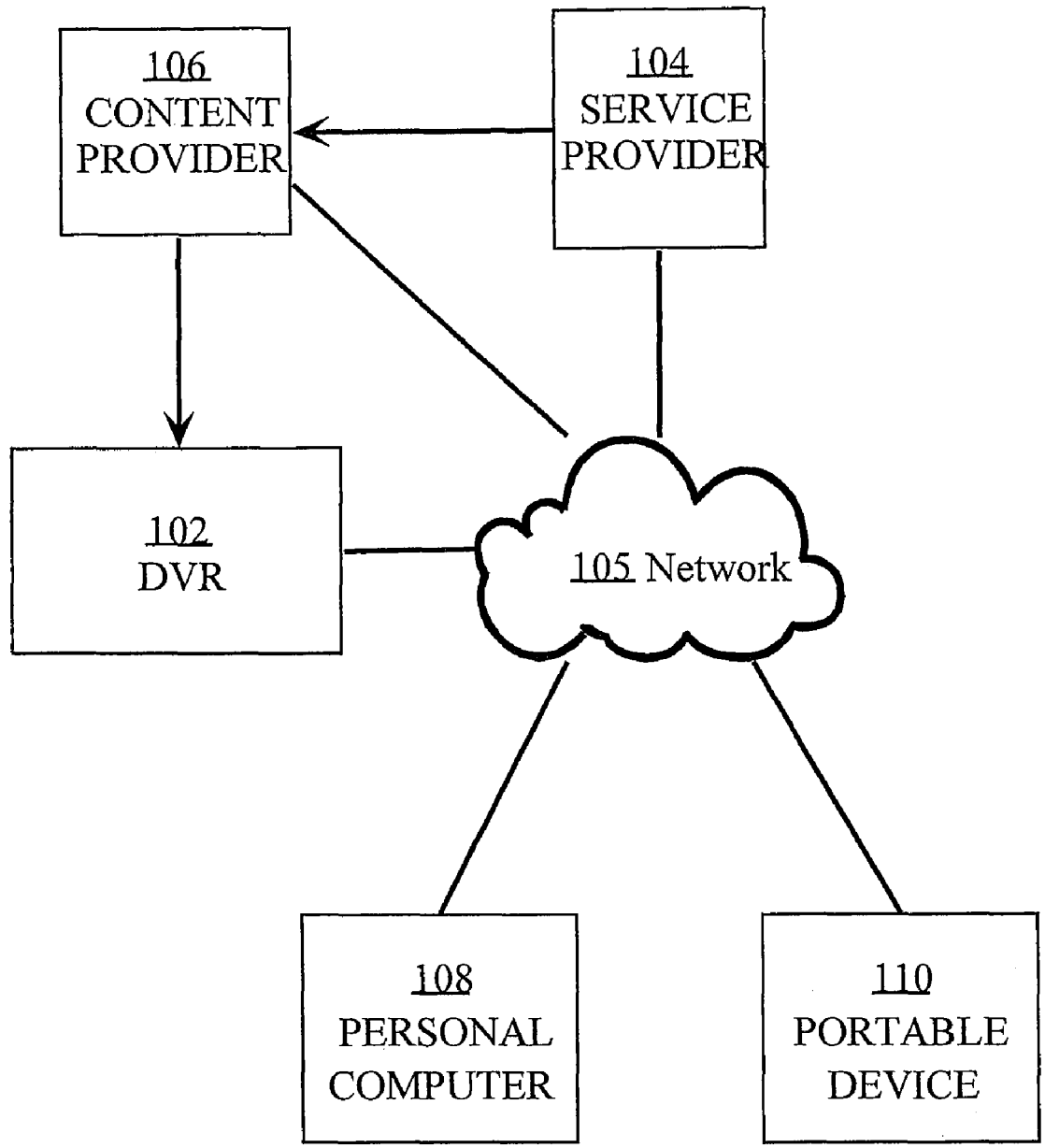
FIG. 1 is a block diagram illustrating a system for providing branded video tags according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 General Overview
2.0 System Structural Overview
3.0 Example Techniques and Processes
   3.1 Unified Searching of Broadband and Broadcast Multimedia Content
   3.2 Tagging Multimedia Content
   3.3 Filtering Broadband and Broadcast Multimedia Content Search Results
   3.4 Partial List and Indicator
   3.5 One Touch Record and Wish List
   3.6 Live or Delayed
4.0 Implementation Mechanisms-Hardware Overview 1.0 General Overview Embodiments of the invention summarized above are described below in greater detail, along with some alternative embodiments of the invention. Although embodiments of the invention described below are described in the context of DVRs, in alternative embodiments of the invention, devices other than DVRs may be substituted for, and may perform similar operations to those that are performed by, DVRs.

In an embodiment, a service receives search requests from client systems and performs an integrated search across databases containing informational data for broadcast content and broadband content using the received search criteria. The service may be owned or operated by a service provider, third party, etc. Owners of client devices are charged a fee by the service provider, third party, etc., for access to the database search service, content recording scheduling, content download service, etc. A user enters search criteria on a client device. The client device can be a DVR, set-top box, cell phone, handheld device, laptop, PC, etc., for example.

The client device formulates a search request given the user's input and sends the search request to the service. The service receives the search request from the client device and formulates a query for at least one broadband database and at least one broadcast database. The broadband database contains data from partners of the service provider such as: Amazon.com, RocketBoom, dLife®, The New York Times®, and CNET®. Broadband databases may exist at each partner's server. The service queries each partner's database with a compatible query that the service creates using information regarding the type of database queries each partner's database requires. Data in the broadband database(s) consists of links to multimedia content that are available for download from the partners. The data also includes information describing the multimedia content such as: program description, program synopsis, program rating, actors, directors, producers, program title, pricing, etc., as well as search data tags.

In an embodiment, the partners pay the service provider a fee for placing data in the database or for having their database searched by the service. For example, partners may pay a fixed fee or a fee based on the number of times that the service queries the partner's database.

The broadcast database contains data from electronic program guide (EPG) providers such as Tribune Media Services®. The EPG data describes programs that are available from many different broadcasters and services such as: DirecTV®, Comcast®, CableVision®, etc. The EPG data contains information describing the program such as the channel that the program is available on, program description, program synopsis, program rating, actors, directors, producers, program title, etc., as well as search data tags.

The service performs searches on both databases using the search queries that it created. The databases can be databases that the service can directly access or database servers hosting the databases or other database services. The service receives or generates results from the search queries and organizes the retrieved information into a format that the client device can use.

In an embodiment, the service also has access to its own client device database where the service stores information regarding the status of all the client devices in communication with the service. The client database includes, among other information, the multimedia content that the client devices have recorded. The service can include in the search results that concern broadband content, multimedia content that is available to download from other client devices. A client device can request downloads of multimedia content from multiple client devices and receive segments of the multimedia content from those client devices.

The client device receives the search results from the service. The client device processes the search results and displays the search results in a list to the user. The service creates the user interface screen for the client device to display. Each time a client device sends a search request to the service, the service formats the data received from the searches of the databases into a user interface screen that is presentable by the client device. The client device receives the user interface screen and displays the screen as formatted by the service. The screen information instructs the client device on how it should respond to any key presses by the user.

In an embodiment, the client device may request a search for multimedia content and for downloading or scheduling the recording of the requested multimedia content. The multimedia content may have been previously stored on one or more databases. The client device may download or schedule the recording of multimedia content in one step, for example, in one touch. When desired multimedia content is not available, the multimedia content is added to the client device's wish list. When the client device's wish list has not already been created, the client device's wish list may be created on the spot. During the scheduling of the recording of the multimedia content, a tag associated with the multimedia content is checked to determine whether the multimedia content is live or delayed. When the tag indicates the multimedia content is live or delayed, the client device prompts with a suggestion to add extra time to the end of the recording of the multimedia content.

2.0 System Structural Overview

FIG. 1 illustrates an example system according to an embodiment. The system contains at least one client device such as DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests. In another embodiment, DVR 102, personal computer 108, and portable device 110 can communicate with each other to transfer content, metadata, or any other data through network 105, communication connection, or any local network.

In another embodiment, content provider 106 may provide, to service provider 104, content data or any metadata, including promotional data, icons, web data, and other information. Service provider 104 may then interpret the metadata and provide the content data and metadata to DVR 102, personal computer 108, or portable device 110.

Figure 2:
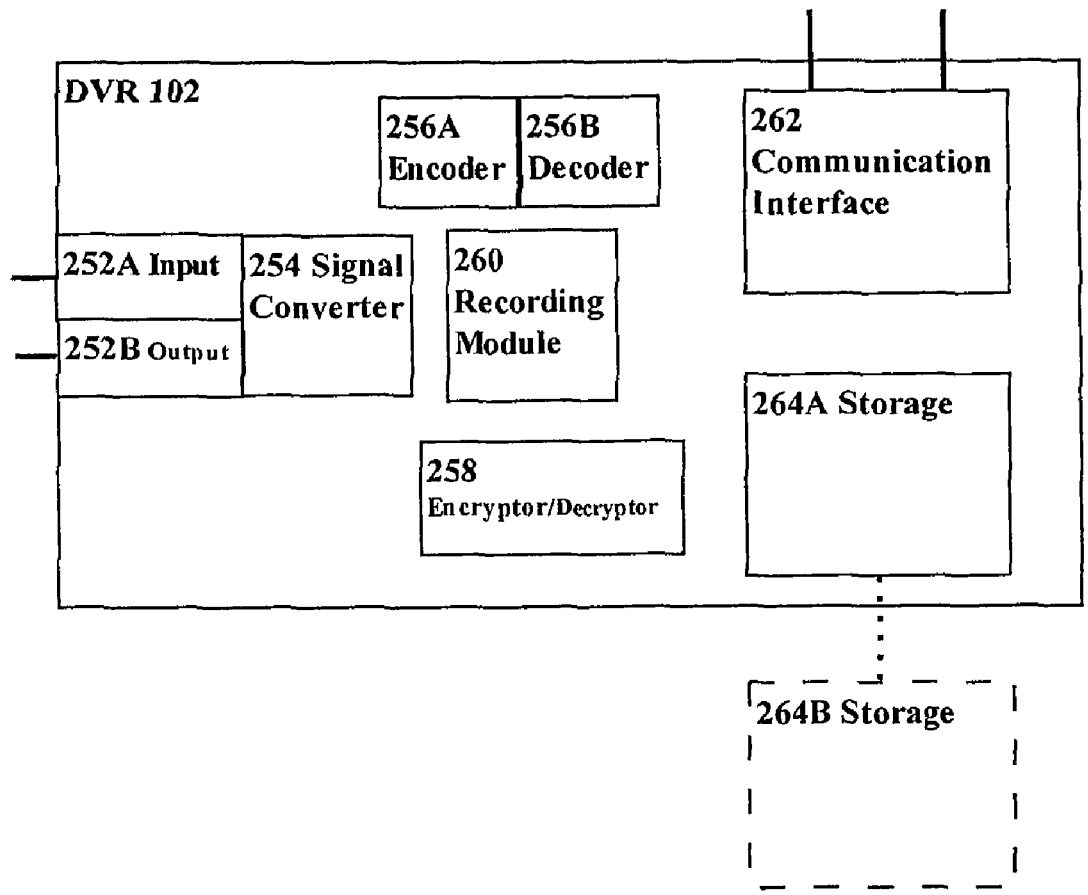
FIG. 2 is a block diagram illustrating a general overview of the components of a Digital Video Recorder (DVR) according to an embodiment of the invention.

Referring to FIG. 2, in an embodiment, DVR 102 generally comprises a plurality of components, signified by signal converter 254, that are necessary to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

Recording module 260 records the incoming data stream by storing the digital data stream on at least one storage facility, signified by storage 264A/264B that is designed to retain segments of the digital data stream. Storage 264A/264B may be one or more non-volatile storage devices (e.g., hard disk, solid state drive, USB external hard drive, USB external memory stick, USB external solid state drive, network accessible storage device, etc.) that are internal 264A and/or external 264B. A signal converter 254 retrieves segments of the data stream, converts the data stream into an analog signal, and then modulates the signal onto a RF carrier, via output 252B, through which the signal is delivered to a standard TV set. Output 252B may alternatively deliver a digital signal to a TV set or video monitor. For example, DVR 102 may utilize a Digital Visual Interface port (DVI) for sending digital signals to a TV via a DVI cable.

DVR 102 also includes a communication interface 262, through which the DVR 102 communicates with network 105 via Ethernet, wireless network, modem, USB, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via encoder 256A and decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 102 can also encrypt or decrypt digital data signals using encryptor/decryptor 258 for storage, transfer or playback of the digital data signals.

In one embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 utilizes a secure distribution architecture to transfer data between the DVR 102 and the service provider 104 such that both the service data and the user's privacy are protected.

3.0 Example Techniques and Processes 3.1 Unified Searching of Broadband and Broadcast Multimedia Content According to one embodiment, an advanced DVR (e.g., DVR 102) allows a user to search for multimedia material across both broadcast and broadband sources. The user forms search criteria (by direct input or selecting a menu item) and instructs the DVR to perform the requested search. The user typically does not have to be concerned about whether the search is for broadcast content or whether the search is for broadband content. The embodiment automatically performs a plurality of searches across dissimilar sources using the user's search criteria. Once the user is presented with a listing of available broadcast and broadband content that matches his search, the user can peruse the list of available content in order to obtain more information for particular content or to schedule recordings or downloads of particular content. The ability to search both broadcast and broadband sources for multimedia content is unique to the embodiment.

Figure 3:
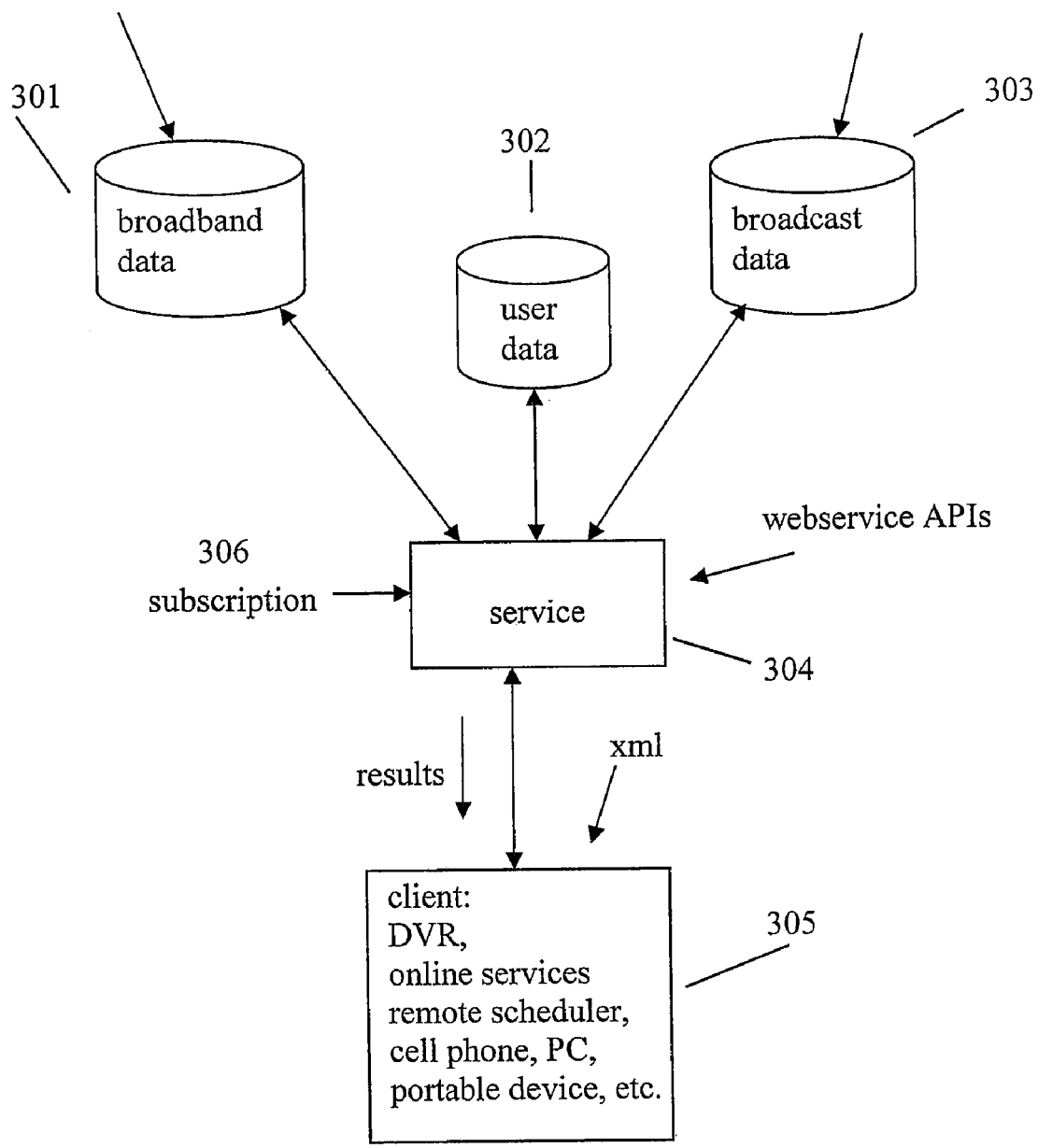
FIG. 3 is a block diagram illustrating an example of a service communicating with broadband and broadcast databases according to an embodiment of the invention.

FIG. 3 illustrates a service 304 that receives search requests from client systems and performs an integrated search across databases containing informational data for broadcast content and broadband content using the received search criteria. The service 304 can be a server implementing searches across databases 301 and 303. The service 304 can also consist of a plurality of Web Service Application Program Interfaces (APIs) that service client requests. The service 304 may be owned or operated by a service provider, third party, etc. Owners of client devices such as client device 305 are charged a fee by the service provider, third party, etc., for access to the database search service, content recording scheduling, content download service, etc. A user enters search criteria on a client device 305. The client device 305 can be a DVR, set-top box, cell phone, handheld device, laptop, PC, etc., for example.

Figure 4:
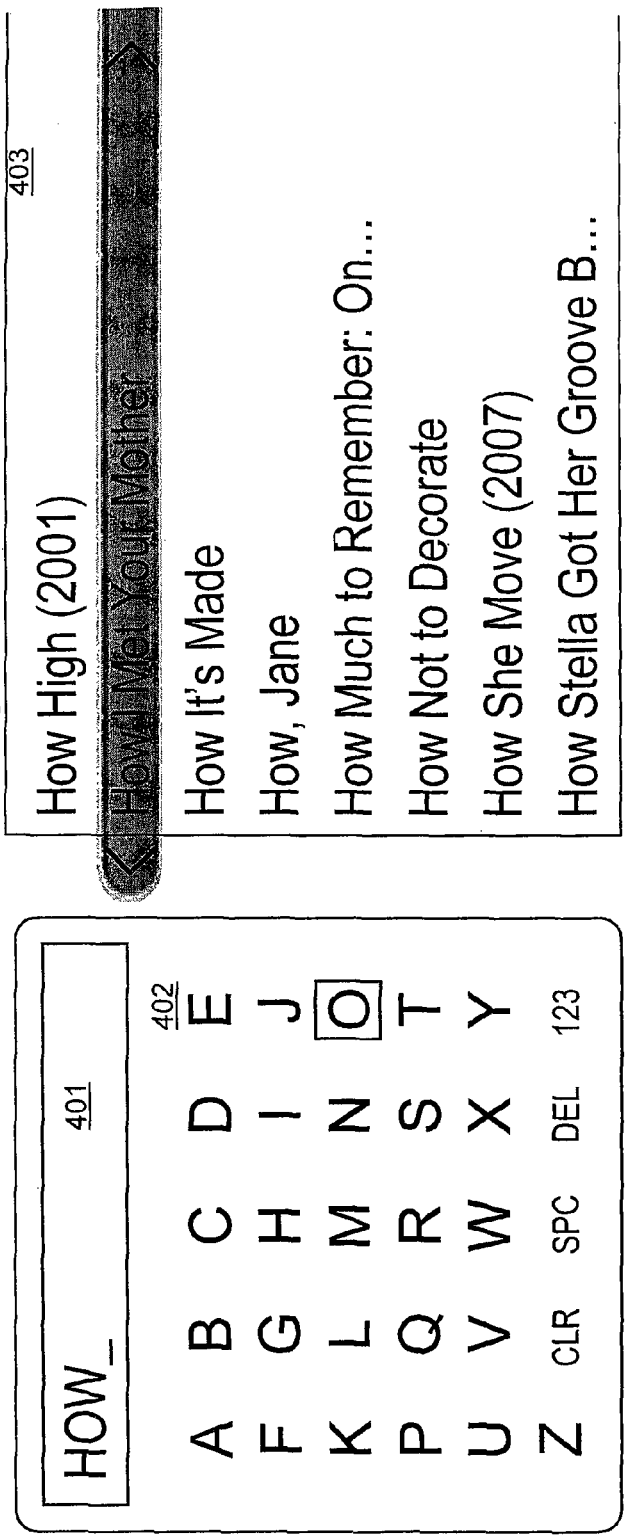
FIG. 4 illustrates an example of a user interface screen that allows a user to input search terms and dynamically displays a list of matches according to an embodiment of the invention.

The client device 305 formulates a search request given the user's input. FIG. 4 illustrates a screen shot of an entry screen 400 where the user enters information such as a keyword, actor name, director name, producer name, program title, etc. As the user enters each character on the virtual keypad 402 in the search, the client device 305 displays the entered characters in an entry field 401. The client device 305 formulates a search request using the entered characters. The client device 304 sends the search request to the service 304.

The service 304 receives the search request from the client device 305. The service 304 formulates a query for each database 301, 303. The databases consist of at least one broadband database 301 and at least one broadcast database 303. The broadband database 301 contains data from partners of the service provider such as: Amazon.com, RocketBoom, dLife®, The New York Times®, and CNET®. Broadband databases may exist at each partner's server. The service 304 then queries each partner's database with a compatible query that the service 304 creates using information regarding the type of database queries each partner's database requires. In an embodiment, the partners pay the service provider a fee for placing data in the database or for having their database searched by the service 304. For example, partners may pay a fixed fee or a fee based on the number of times that the service 304 queries the partner's database. The broadband database(s) makes it possible for the partners' products and services to be displayed to users. Data in the broadband database(s) consists of links to multimedia content that are available for download from the partners. The data also includes information describing the multimedia content such as: program description, program synopsis, program rating, actors, directors, producers, program title, pricing, etc., as well as search data tags (described below).

The broadcast database 303 contains data from electronic program guide (EPG) providers such as Tribune Media Services®. The EPG data describes programs that are available from many different broadcasters and services such as: DirecTV®, Comcast®, CableVision®, etc. The EPG data contains information describing the program such as the channel that the program is available on, program description, program synopsis, program rating, actors, directors, producers, program title, etc., as well as search data tags (described below). EPG data is typically updated periodically and typically covers 14 days of programming. The number of days is dependent upon the service provider. The EPG data covers, for example, the U.S., Mexico, Canada, and other countries. Given that the EPG data is on the service provider's database 303, the service provider can retain all the EPG data that EPG providers have delivered. This gives the service provider historical data from which a user can obtain historical data or program names. The service can provide a client device with information from the historical EPG data regarding multimedia content such as when the content was last broadcast. This type of information is typically not obtainable in normal DVRs or EPG services because EPG data is typically limited to a number of days, such as 14 days. Search requests for content that is not in a typical 14-day EPG would receive a null search response. In this embodiment, because the service has the historical EPG data, the search requests would receive a positive hit as long as the content has been shown in the time frame of the service's EPG data.

The service 304 performs searches on both databases 301, 303 using the search queries that it created. The databases 301, 303 can be databases that the service 304 can directly access or database servers hosting the databases or other database services. The service 304 receives or generates results from the search queries and organizes the retrieved information into a format that the client device 305 can use.

In an embodiment, the service 304 also has access to its own client device database (not shown) where the service 304 stores information regarding the status of all the client devices in communication with the service 304. The client database includes, among other information, the multimedia content that the client devices have recorded. The service 304 can include in the search results that concern broadband content, multimedia content that is available to download from other client devices as described in U.S. patent application Ser. No. 11/285,411 which is owned by the Applicants and is hereby incorporated by reference. A client device can request downloads of multimedia content from multiple client devices and receive segments of the multimedia content from those client devices. This allows a user to obtain multimedia content that has not been broadcast for a long time period and is not scheduled to be broadcast as well as not being available from partners.

The client device 305 receives the search results from the service 304. The client device 305 processes the search results and displays the search results in a list 403 to the user. The list 403 begins with the first multimedia content that matches the characters in the entry field 401 that the user has entered. The list can be updated at each character entry or after a few seconds of inactivity from the user. The user may pause while entering characters to allow the list to be refreshed. The client device 305 creates the search request to the service 304 upon each character entry or few seconds of inactivity. This gives the user a dynamic list that reacts to the user's input in a rapid manner.

Figure 5:
FIG. 5 illustrates an example of a user interface screen that displays a program synopsis and user-selectable menu items according to an embodiment of the invention.

The user can also access the search mechanism through a program information screen that the user displays for a particular content that is on an EPG or has been recorded. FIG. 5 shows a screen 500 that is displayed for a recorded program. The screen 500 allows the user to navigate through menu options and select the search option 501.

When the user selects a multimedia content from the list 403 or the search option 501, the client device 305 displays a screen as in FIG. 6. The screen 600 displays information related to the selected multimedia content. Information contained in the data sent from the service 304 is used to display program information such as the program synopsis 601. The received data also may contain additional search terms 602 that allow the user to select more search terms that are related to the multimedia content. The data may also contain search request information regarding upcoming showings for the multimedia content 603 or available downloads for the multimedia content 604.

If the user selects upcoming showings for the multimedia content 603, the client device 305 sends a search request to the service 304 that requests information regarding upcoming showings for the multimedia content. The service 304 queries the broadcast database 303 for the upcoming showings for the multimedia content and sends the resulting data to the client device 305. FIG. 7 illustrates a screen 700 displaying upcoming broadcast showings for the multimedia content using data received from the service 304. The client device 305 receives EPG data relevant to channels the user receives, subscribes to, or the channels that are available in the area that the client device is in.

In one embodiment, the service 304 receives subscriber information 306 and looks up user data from a user data database 302 in order to supply the client device with the correct information regarding multimedia content that is available to the specific user via broadcast or broadband access. The service 304 can use the user's information to formulate search queries from the broadband database 301 and broadcast database 303 in order to find information that is appropriate for the user's location, age, preferences, etc. In one embodiment, the service 304 can filter content information based on the user's age or client device's parental control setting (described in further detail below).

If the user selects available downloads for the multimedia content 604, the client device 305 sends a search request to the service 304 that requests information regarding available downloads for the multimedia content. The service 304 queries the broadband database 301 for the available downloads for the multimedia content. As noted above, this operation could involve querying multiple partner databases. The service 304 sends the received query data to the client device 305. FIG. 8 illustrates a screen 800 displaying available downloads for the multimedia content. In this example, some of the available downloads are for episodes of a program series that are available from a partner. The screen 800 can display the list of available downloads 801 with the partner's logo 802 next to content titles available from that particular partner. The logo data can come from the broadband database 301 or the service 304. The user can select an episode from the list of available downloads 801 to download the content to his client device 305.

The download may originate from a partner and the user is presented with a screen that may display a synopsis of the episode and any costs associated with the download. The user may also select a download that is retrieved from other client devices as discussed above and as described in U.S. patent application Ser. No. 11/285,411. The service 304 filters one or more client devices according to a number of factors, including bandwidth, to create a pool of client devices for transferring the content. The service 304 initiates the transfer by either requesting each client device in the pool of client devices to begin transferring the content to the requesting client device 305, or by directly requesting the client device 305 to retrieve the content from the pool of client devices. The content is sent to the requesting client device in portions which are re-assembled at the client device 305 and stored for later playback. It is not necessary for the user to know where the download is originating from and the user may or may not be told what mechanism is being used to download the episode.

FIG. 9 illustrates a screen 900 displaying program information 901 for the multimedia content. The screen 900 also displays an option where the user can obtain more information about episodes (episode guide) of the multimedia content 902. If the user selects the episode guide 902, the client device 305 sends a search request to the service 304 that requests information regarding episode information for the multimedia content. The service 304 queries the broadcast database 303 and/or the broadband database 301 for the episode information for the multimedia content. The service 304 processes the received data and sends the processed data to the client device 305.

FIG. 10 illustrates a screen 1000 displaying available episodes for specific seasons for a particular series title. In an embodiment, each time the user selects a season further in the list 1001, the client device 305 sends a search request to the service 304 that requests information regarding episode information for the selected season for the multimedia content. The service 304 queries the broadcast database 303 and/or the broadband database 301 for the season episode information for the multimedia content. The service 304 processes the received data and sends the processed data to the client device 305. The client device 305 displays the list of episodes to the user 1002.

FIG. 11 illustrates a screen 1100 displaying tags that are associated with the multimedia content or series title. The user can perform a search by clicking on any of the tag keywords or phrases 1101. The client device 305 creates a search request using the selected tag. The service 304 performs a search of tag information contained in the broadband database 301 and/or the broadcast database 303 in the same manner as searches described above.

In an embodiment, the service 304 creates the user interface screen for the client device 305 to display. Each time a client device sends a search request to the service 304, the service formats the data received from the searches of the databases into a user interface screen that is presentable by the client device. The client device receives the user interface screen and displays the screen as formatted by the service 304. The screen information instructs the client device on how it should respond to any key presses by the user. For example, the user moves the highlight bar down and the client device checks which items on the screen are selectable and moves the highlight bar to the next selectable item on the screen. If the user selects an item, then the client device looks at the screen information to see if the selection operation merits the highlight bar moving to another location or requires that a search request be sent to the service 304. This allows the service to change the look and feel of user interface screens dynamically without having to update the client device's software to implement user interface changes. This approach is easily scalable and presents a highly maintainable model. Alternatively, the client device can format its own user interface screens when it receives screen information from the service 304.

3.2 Tagging Multimedia Content

Tags 1101 are also shown as an option that may be selected as shown in FIG. 11 on the left side of the screen. For the television series "Doogie Howser, M.D.", the tags "coming of age," "doctor," "medical," and "prodigy" are shown. When a tag is selected, content associated with that tag appears on the right side of the screen. In this example, for the tag "doctor", the television series "ER", "Grey's Anatomy" and "Scrubs" appear because they are associated with the tag and are scheduled to be shown in the near future.

Tags, as used herein, refer to a set of words, pictures or other media used to link various pieces of content together. Examples of tags may be, but are not limited to, locations in which the content is set, genres to which the content belongs, or the subject matter associated with the content. If the term "New York" is searched, results returned may include the television series "Friends", and the movies "Gangs of New York" and "Ghostbusters". The results are returned because each selection is set in the city of New York. In another example, the term "marriage" is searched. This search returns content that are associated with "marriage". Some results may include the television series "Wedding Story," certain episodes of television series in which marriage occurs such as "Friends," and the movie "The Runaway Bride".

Tags linked to content may include any association with words. Some examples of tags are "singing," "reality TV," "fashion," "terrorist," "crime," and "roommate." Tags may be added or changed over time. Tags are also not limited to words, but may consist of a picture associated with content (an example is the symbol that identifies singing star Prince), or other media such as sounds or music. For example, a selection of new age music may be associated with a show on spirituality and a selection of heavy metal music may be associated with a television show on skateboarding.

Tagging may be performed on either broadcast content or downloadable content. Broadcast content includes, but is not limited to, content from over-the-air antennas, satellite, and cable. Downloadable content includes, but is not limited to, broadband video, podcasts and other forms of audio, images, and RSS feeds.

In an embodiment, tags may be created by the service provider. For example, the service provider might wish to point out certain subject matter available on a television program. In this way, if a user repeatedly views a certain video segment that relates to a certain subject matter, then the service provides associations to other video segments that relate to the certain subject matter. The service provider may also provide tags that originate from the content provider.

In another embodiment, the content provider creates tags for the content provider's own programming. In this circumstance, the tags are not provided first to the service provider for dissemination for additional editorial. This allows the content provider to have the assurance that tags provided to users are accurate and reflect the intention of the content provider. The tags may then be used by the content provider to ensure that users may be linked to other shows that contain similar content or appeal to a similar demographic of users.

According to another embodiment, multimedia devices such as DVRs, PCs, cell phone, and handheld computing devices are used to create tags for video programs, herein referred to as "community tagging." Using a control interface such as a remote control, touch screen, touchpad, or a keyboard, when a user is viewing a video program, the user enters possible terms that associate the content to the tag. For example, the user might use the control interface to mark a program segment, or alternatively to mark an event within the video program. For instance, when viewing a sporting event such as a football game, the user signals via remote control when an exciting play occurs. The user may enter the term "exciting" and the tag is then associated with that program. Community tagging may be completely open or subject to the editorial of the service provider in order to maintain a sense of order. Also, community tagging may be aggregated so that only the most common actions are selected and then the tags may be disseminated to the network of users.

In an embodiment, data that may be selected is not limited to words used in credits and tags, but may include other media such as video, pictures, or sounds. Examples of pictures include, but are not limited to, headshots of actors, movie posters, or still frames from shows or movies. Sounds may include, but are not limited to, theme music from a show, music from a motion picture, or an actor's voice.

3.3 Filtering Broadband and Broadcast Multimedia Content Search Results

The service 304 has the ability to filter database query results according to user preferences, user personal information, client device settings, etc. As briefly discussed above, in an embodiment, the user can set preferences and personal information in his client device such as channels that he receives, channels that he views, age, sex, shows that the user likes and dislikes, the user's interests, credit card information, home address, etc.

When a client device 305 sends a search request to the service 304, the service 304 creates queries to the broadcast database 303 and/or the broadband database 301. Upon receipt of the requested data, the service 304 can filter the data to customize the data for the client device 305. In one embodiment, the service 304 can supply broadcast information to the client device 305 that only pertains to the channels that the client device receives. In another embodiment, the service 304 can supply the client device 305 with broadcast information that only pertains to the channels that the user watches.

This type of filtering can be performed on an opt-in/opt-out basis. If a user opts-in, the user has given the service permission to use the user's preferences and personal information 302, 306, to automatically filter requested broadcast and/or broadband information to match the user's preferences and personal information.

If the user opts-out, then the service can only use information that it knows about the client device 305 that does not involve the user's personal information. The service 304 is limited to the client device's locale and channels that a client device would receive in that area from the local cable or satellite broadcaster.

The service 304 can also filter information based on the type of client device. For example, if the client device 305 is a portable video device, then the service 304 may send a condensed version of the search results to the client device 305.

In an embodiment, the user can specify to the client device 305 that his selection of a search term is to be limited to a certain type of media or access. For example, the user can specify that the search be limited to HD (High Definition) content only. The user could also specify that the content listed be available from broadband only or broadcast only. The user can create any combination of such search limitations. Another embodiment would allow the user to specify combinations of tags that are displayed on a screen. Referring again to FIG. 11, for example, the user could specify combining the tags of Peter Riga 1102 and Prodigy 1104, or Prodigy 1104 and Coming of Age 1103, or any other combination of tags.

The user has the capability to select each tag using the highlight bar. Each time the user selects a tag, he can press a button on a remote control to signify that the selection is part of a combination. Once the user has selected all of his desired terms, he can press another button (or the same button) on the remote control that tells the client device 305 that the search is to be performed. As an example, the user selects Prodigy 1104 and Coming of Age 1103 and also selects HD content only. The client device 305 then formulates the search request and sends the request to the service 304. The service 304 creates queries across the databases that are appropriate for the search. Here, since the user has specified that the search be HD content only, the service 304 queries the broadband database 301, or partner servers as mentioned above, and the broadcast database 303 for HD content that includes tags or other content information that match the search tags that were selected, e.g., Prodigy and Coming of Age. The service 304 returns the query results to the client device 305. The client device 305 displays the search results to the user.

3.4 Partial List and Indicator

In an embodiment, a user may search through content in one or more content databases. For example, the user may search for entries (e.g., multimedia content), which had been or will be broadcasted, in broadcast data 303. For example, the ability for the user to search through content in the broadcast database may include every program that had ever been imported into such database. Thus, it is possible that the result of a search request may return to the user a very large list of entries, such as over a few hundred entries.

In an embodiment, to handle very large search results, service 304 returns to client device 305 a predetermined number of entries, rather than the entire list of entries. For example, service 304 may return to client device 305 a list of fifty (50) entries out of a total number of entries in the large search results. In an embodiment, an indicator is returned along with the predetermined number of entries of the large search results. The indicator indicates whether the list of predetermined number of entries is a complete list or a partial list. If the indicator indicates that the list is a partial list, then the user may select to view other entries of the large search results. For example, a Next 50 button may be presented to the user along with the partial list containing 50 entries. The user may select to view the next 50 entries by clicking the Next 50 button. Similarly, a Previous 50 button may be presented to the user along with the partial list containing 50 entries. The user may select to view the previous 50 entries by clicking the Previous 50 button.

Figure 13:
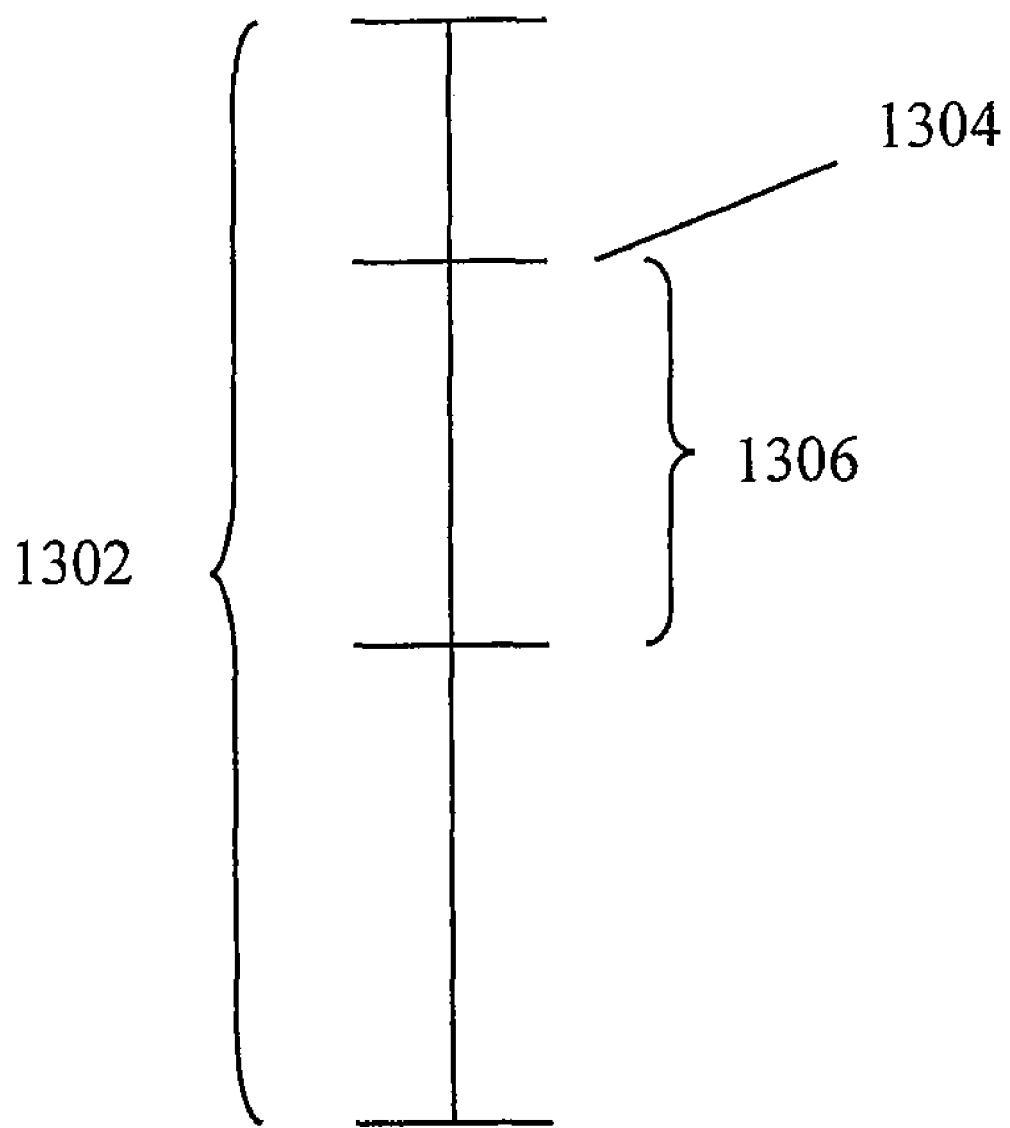
FIG. 13 is a schematic diagram of a list and an anchor according to one embodiment.

In an embodiment, a list of entries from a search result is displayed along with an anchor. An anchor is a particular entry used as a point of reference among the other entries, for example, in the context of browsing. Browsing search results by way of an anchor may be described with reference to FIG. 13. FIG. 13 is a schematic diagram showing a bar whose length 1302 represents the list of entries from the search result. A particular position within the list is an anchor 1304. Anchor 1304 represents a position in the list that the user has selected. From anchor 1304, the user is presented with the next predetermined number of entries 1306. For example, from a particular entry associated with the position of anchor 1304, the user is also presented with the next 50 entries 1306. In another embodiment, the user is presented with the previous predetermined number of entries, such as the previous 50 entries. In yet another embodiment, the anchor is presented along with the previous twenty-five (25) entries as well as the next 25 entries. Thus, the user may move back and forth in the list by moving anchor 1304. For example, the user may move anchor 1304 by clicking on another entry and making that entry the current anchor. In an embodiment, browsing search results by way of anchoring uses a count and an offset. The count is a value used to indicate the position of the anchor. The offset is a value used to determine the number of entries from the position of the anchor.

In an embodiment, a toggle indicator is sent to the user. Using the toggle indicator, a user may toggle between being presented with the entire list of results from a search request and being presented with a partial list that may be specified by particular criteria. For example, a user may choose to be presented with the partial list consisting of multimedia content that are available in the next fourteen (14) days, rather than the full list of multimedia content that are available in the next fourteen (14) days. Then, when the user desires to view the full list, the user may toggle to the full list selection. It should be appreciated that certain details presented herein are by way of example only and are not meant to be limiting.

3.5 One Touch Record and Wishlist

One Touch Record

In an embodiment, a one touch recording feature allows a user to select to record a multimedia content (e.g., a television program) in one touch. For example, a user may press a record button on a remote control device, e.g., while a program is playing, a recorded movie is being played back, or a commercial about a multimedia content is playing. In another example, a user may press a button on the remote control in response to an indicator on an interactive user interface when the user finds a multimedia content and desires to record such multimedia content. The multimedia content may be a program or series of programs that the user is interested in viewing. Example screen shots showing a selectable indicator that a user may select for recording a multimedia content are depicted in FIG. 14 and FIG. 15, respectively. Referring to FIG. 14, an indicator 1402 labeled, "Record this episode" is shown which, when selected, activates a process for recording the episode or for scheduling to record the episode. The client device schedules the episode for recording using the EPG that it has stored locally. If the episode is currently being shown, the client device automatically starts recording the episode and if there is any portion of the episode that is in the client device's cache buffer, the client device adds the cache buffer's portion of the episode to the recording. In an embodiment, the client device tells the service that the user has requested the recording and the service schedules the recording in a master schedule that the service has for the client device. The service later downloads the master recording schedule to the client device, thus updating the client device's local recording schedule. Thus, selecting indicator 1402 is a "one touch record" process for recording the episode.

Similarly, the interactive screen in FIG. 15 shows an indicator 1502 labeled, "Record this program" which, when selected, activates the process, as described above, for recording the program or scheduling the program to be recorded. Thus, selecting indicator 1502 is a "one touch record" process for the program.

Creating a Wishlist

In an embodiment, a wishlist is a list of entries that correspond to one or more multimedia content that a user wants recorded when the one or more multimedia content, such as a particular episode or program, is ever broadcast. An example of a type of entry in a wishlist may be a program identifier (program ID) that corresponds to and identifies a particular multimedia content. For example, suppose a user desires to watch only one episode of a weekly running show because the particular episode features a particular actor as a guest actor. According to an embodiment, the user may add this particular episode to the user's wishlist. When the particular episode becomes available to be scheduled or downloaded, the particular episode is automatically scheduled to be recorded or is automatically downloaded. The user could also create a wishlist for any episodes or programs that a certain actor was in or a certain director, producer, etc. The client device can look for episodes or programs that have any criteria that the user specifies in the wishlist.

Referring to FIG. 16, an example screen shot shows information for a particular episode, Episode 1, for the show, "How I Met Your Mother." Also presented in the screen is link 1602, labeled, "Create a WishList for this episode." When the user selects link 1602, a wishlist is created and an entry corresponding to and representing this episode is added to the wishlist. An example wishlist is described in detail below in the section entitled, "An Example Wishlist".

One Touch Record and Wishlist

An embodiment for one touch record and wishlist process that includes multimedia content, such as programs, that may not be readily available is described with reference to FIG. 17, a flow diagram illustrating a one touch record and wishlist process for a program. Upon browsing through multimedia content, e.g., resulting from a search of the databases 301 and 303 and, possibly, of the historical EPG data, a user may find a desired multimedia content, such as a desired program, that the user would like to record. The user may activate a one touch record indicator (1702). In an embodiment, it is determined whether the desired program is airing in a next predetermined or specified amount of time, such as for example, in the next two weeks (1704). If it is determined that the desired program is airing in a next predetermined or specified amount of time, the desired program is scheduled to be recorded (1706). For example, if the desired program is scheduled to be broadcast over network television at a particular time of the next day, then the broadcast is scheduled to be recorded at that particular time the next day. If the desired program is available to be downloaded, then a process for downloading the program begins. For example, upon activation of the one touch record mechanism (1706), the desired program begins to download. The client device downloads the program from a partner or other client devices as described above. In an embodiment, if there is a cost associated with the download, the client device may ask the user if the cost is acceptable before performing the download. If the user prefers not to accept the charge for the download, the user may cancel the download and select another option such as placing the desired program on a wishlist or scheduling a recording of the desired program, if available.

When the desired program is not airing in the next predetermined or specified interval, for example it is not airing in the next two weeks then the program may be added to the user's wishlist. If a wishlist has not already been created for the user, then a wishlist may automatically be created (1708). After the wishlist is automatically created, the program is added to the wishlist. Thus, when the program becomes available for downloading or for scheduling to be recorded (1710), the desired program on the wishlist is downloaded or is scheduled for recording.

In an embodiment, the client device may perform the above steps in another order depending on rules that are determined by the service or rules specified by the user. For example, the service may specify that the client device first look for the desired multimedia content from the broadband content database. This gives the service's partners an advantage to present their content offerings to the user before the client device checks for recording the desired multimedia content from the broadcast stations. The user may also set his own rules by specifying, for example, that searches for desired multimedia content begin with checking for broadcast times for the desired multimedia content followed by searching for the desired multimedia content from broadband downloads if it cannot be found that any broadcast sources are broadcasting the desired content within a predetermined or specified time frame. If the desired multimedia content cannot be found from either broadband or broadcast sources (not necessarily in that particular order) then the client device sets up a wishlist or wishlist entry for the desired multimedia content using, for example, the desired multimedia content's program ID. The client device uses the program ID to perform periodic searches of its EPG data for a subsequent showing of the program ID.

In another embodiment, as discussed above, the service performs a search for the user's desired multimedia content using the broadband and broadcast databases. In an embodiment, the service may also perform a search for the user's desired content using historical EPG data. If the service finds the desired multimedia content in the broadband database, the service creates a display screen or search information for the client device that contains information that the user can download the desired multimedia content. If the user selects that option from the display screen, the client device sees from the screen information that it should download the multimedia content from a certain URL or IP address. The client requests a download of the desired multimedia content from that URL or IP address. The client then stores the downloaded multimedia content.

If the service finds the desired multimedia content in the broadcast EPG, it can additionally or only create an entry on the display screen that the user can select to record the desired multimedia content. If the user selects to record the program menu item, then the client device checks the screen information and finds that it should schedule a recording of a program ID that the service determined from its EPG. Finally, if the service finds that the desired multimedia content is not available from both broadcast and broadband sources, it creates an entry on the display screen or the search information that the user can select to place the desired multimedia content in his wishlist. The client device checks the screen information and finds that it should schedule a recording of a program ID (that the service determined from its historical EPG data) in its wishlist. As with the previous embodiment, the service may perform the searches of the broadcast and broadband databases in an order that the service has determined or an order that the user has specified.

In yet another embodiment, as discussed above, the service performs a search for the user's desired multimedia content using the broadband and broadcast databases. If the service finds the desired multimedia content in the broadband database, the service requests a download of the desired multimedia content from a URL or IP address from the broadband database. The service then sends the downloaded multimedia content to the client device which stores the multimedia content.

If the service finds the desired multimedia content in the broadcast EPG, it can instruct the client to schedule a recording of a program ID that the service determines from its EPG data. Finally, if the service finds that the desired multimedia content is not available from both broadcast and broadband sources, it places the desired multimedia content in a wishlist and sends the wishlist to the client device to update the client device's local wishlist with the information. The client device schedules a recording of a program ID (that the service determined from its historical EPG data) in its wishlist. As with the previous embodiment, the service may perform the searches of the broadcast and broadband databases in an order that the service has determined or an order that the user has specified.

DVR and Wishlist Synchronization

In an embodiment, data contained in a user's wishlist that is resident at the service is synchronized on a periodic basis with the user's DVR. In an embodiment, a copy of the user's wishlist at the service is downloaded to the user's DVR. In another example, the user's DVR and the user's wishlist are synchronized every six (6) hours. When content in the user's wishlist becomes available, the DVR downloads the content after synchronization. When content in the user's wishlist is to be broadcasted or played at a known point in time, the user's DVR schedules to record the multimedia content after the synchronization, accordingly. In an embodiment, and referring to FIG. 3, user's DVR 305 may have to "opt in" to a service and to be on the network for synchronization to work which includes the service accessing the user's wishlist on the DVR. For example, when user's DVR 305 has opted in to have the user's information available to the service, the user's DVR 305 is then able to send messages to and receive messages from service 304, even when a user is not actively using or the DVR 305. In an embodiment, service 304 is granted access to the user's DVR 305. With access granted to the user's DVR 305, service 304 may gather current informational data from the user's wishlist on user's DVR 305.

As an example, suppose a user has opted in. Further, suppose the synchronization process is scheduled to activate every six hours. Suppose after the user has opted in, the first activation of the synchronization process occurs at noon. For example, service 304 may check the user's wishlist stored on user's DVR 305 for multimedia content stored in broadband data 301 or with broadcast data 303, which service 304 is configured to search. Suppose the user had added a particular episode of Gilligan's Island to the user's wishlist. In accordance with an embodiment, service 304 may check the broadcast database 303. In this example, service 304 does not find the particular episode of Gilligan's Island playing in the next two weeks. Then, suppose at 3 pm, the user adds the program, King of Queens, to the user's wishlist. At 6 pm, the next synchronization processing event, service 304 searches the user's wishlist on user's DVR 305 and discovers the new addition, King of Queens. Service 304 searches broadband database 301 and does not find a match for King of Queens. Service 304 searches broadcast data 303 and finds a match for King of Queens. The match for Kind of Queens is a showing of the program that evening at 7 pm on channel 551. Thus, service 304 instructs the client device to schedule to record the 7 pm showing of King of Queens to be recorded when it plays at 7 pm on channel 551.

An Example Wishlist

An example wishlist is, but is not limited to, the wishlist feature described in the U.S. patent application Ser. No. 10/425,308, entitled, "SMART BROADCAST PROGRAM RECORDING PADDING AND SCHEDULING SYSTEM," filed on Apr. 28, 2003, which is subject to an obligation of assignment to the same entity, and which is incorporated by reference herein in its entirety by this reference thereto. It should be appreciated that this example wishlist is for illustrative purposes only and is not meant to be limiting. A detailed description of the example wishlist as described in the afore-mentioned patent application is provided as follows.

In addition to season passes, a user can also designate a wishlist of programs that he would like to have recorded if those shows are ever aired. A wishlist is set up by the user where the user specifies a search feature that uses user defined search criteria, e.g., categories, actors, keywords, combinations of search terms, etc., and finds upcoming programs. The user can set up multiple wishlists.

A scheduler on the client device periodically, e.g., when updated program guide information (containing upcoming program information and broadcast times) is received, searches the program guide information for shows that meet the criteria on the user's wishlist for as long as the user keeps the wishlist. The user can look at a list of upcoming shows resulting from the search. The user can also set a wishlist to auto-record the wishlist and the scheduler will schedule every program on the wishlist for recording that it finds. For example, if the user selects a specific actor wishlist, the scheduler automatically records movies that the particular actor is listed in. The recordings are also subject to any conflict resolution for conflicts with other scheduled recordings.

Wishlist programs can have their start and/or end times padded by the user in the same manner as season pass programs. Just like season passes, there may be reasons why padding is put into place by a user. For example, if a wishlist is for shows that are sports shows with the San Francisco Giants playing, it is widely known that baseball games run over the posted broadcast ending time. The user can set an overrun value for that wishlist.

Any conflicts that occur between the scheduling of a program or season pass recording with other programs or season passes scheduled for recording are found by the scheduler. The scheduler indicates to the user that a conflict has occurred for a scheduled program. Conflicting programs and/or season passes are listed to the user. The user then decides to cancel the conflicting scheduled recordings or to not record the present program. The scheduler can alternatively perform automatic conflict resolution using set rules or rules specified by the user.

A season pass manager screen can show the season passes and wishlists that the user has selected. The user can find out what the upcoming shows to be recorded will be by selecting the season pass or wishlist. The user can also change the priority of the season pass or wishlist by moving the entry up or down the list.

The priority of the season pass or wishlist determines which program is recorded in case of a conflict in the scheduling of a recording. For example, a show that is to be scheduled for recording may overlap with another show that is already scheduled for recording, causing a conflict. There are two levels of conflicts that can occur. The first is a single show conflicting with another show or season pass and the second is multiple shows conflicting with a season pass.

The reason why a season pass is used for this example is because a season pass is generally fairly consistent. For example, a season pass may be for only first run episodes of a show. The first run episodes are only broadcast every Tuesday at 8:00 pm PDT, for example. When a season pass has conflicts with any other shows already scheduled, the user has the option to record all of the season pass or the non-conflicted episodes. Additionally, the user is allowed to resolve conflicts on an episode by episode basis. Wishlists are handled in the same manner.

The scheduler manages the recording of the season passes, wishlists, and manually selected recordings. This means that there are several different sources from which a conflict may arise. Shows not only conflict with scheduled broadcast times but things get more complicated with the addition of user adjusted padding. The user does not want to get involved with every decision that must be made with regard to a conflict and since the scheduler receives periodic program guide updates, conflicts will regularly occur. With smart padding activated, the scheduler has the ability to automatically adjust to the user's padding settings, i.e., adjusted start and end recording time adjustments.

The scheduler provides the following options for padding:

Explicit—Requested by the user. This means that at some point, the user requested to add padding to a season pass, wishlist, or single program.

High Priority—The padding has the same priority as the recording for which it is set. For example, if the padding of a high priority season pass recording conflicts with the body of a lower priority season pass recording, the high priority padding wins. The low priority recording is either cancelled (if the padding is greater than the low priority recording's duration) or started late.

Low Priority—The padding has lower priority than the recordings. For example, if the padding of a high priority season pass conflicts with the body of a lower priority season pass recording, the low priority recording wins. The padding of the high priority recording is dropped.

Required—The padding must be scheduled, or the entire recording should be cancelled.

Optional—If padding has a conflict, it's ok to get the recording without the padding.

The combinations of options can be set by the system or by the user. The most common are Explicit/High Priority/Required, Explicit/High Priority/Optional and Explicit/Low Priority/Optional. The scheduler uses the options to make its conflict decisions. The options can be set for all recordings down to the single program granularity. Designating options at a program level requires too much user interaction for setting a recording, so it is much easier for the user to set the options at a higher system-wide level.

Explicit/High Priority/Required Examples:

First high priority recording with the designated options, conflicts with a second high priority recording, then the scheduler cancels the first recording.

First high priority recording with the designated options, conflicts with a second high priority recording with the designated options, then the scheduler cancels the later scheduled recording.

Explicit/High Priority/Optional Examples:

First high priority recording with the designated options, conflicts with a second high priority recording, then the scheduler cancels the padding of the first recording.

First high priority recording with the designated options, conflicts with a second low priority recording, then the scheduler uses the padding and starts the second recording later.

Explicit/Low Priority/Optional Examples:

First high priority recording with the designated options, conflicts with a second low priority recording, then the scheduler cancels the padding of the first recording.

First high priority recording with the designated options, conflicts with a second low priority recording with the designated options, then the scheduler cancels the conflicting padding for both recordings.

The scheduler uses the season pass manager's priority settings to determine the priority of a season pass or wishlist recording. A user's single program recording is explicitly programmed by the user and is considered high priority.

The scheduler can also adjust the padding in order to resolve a conflict. The adjustment is determined by the scheduler using a predetermined threshold.

For example, using Explicit/High Priority/Optional, a set of scheduler threshold values can be set to:

StartLate(body)=1 minute; StartLate(padding)=any

StopEarly(body)=0 minutes; StopEarly(padding)=any

This means that when two programs conflict, the scheduler can propose, to the user, resolving the conflict by taking the lower priority program and dropping: 1) any amount of its start or end padding; 2) up to one minute at the start of the program body; or 3) no amount at the end of the program body. For newly-requested programs, the user is asked to confirm the conflict resolution:

If the conflict can be resolved using the above example thresholds, a conflicts screen is presented so that the user can accept/decline any of the proposed adjustments to the scheduled recordings or not record the newly requested program.

If the conflict cannot be resolved, a conflicts screen is presented so the user can cancel the conflicting recording or decide not to schedule the new recording.

For existing season pass, wishlist, and single program conflicts detected when the scheduler periodically runs, the conflict will be automatically resolved according to the thresholds set or, if no thresholds are set, the straight-forward approach for the options selected.

The scheduler can optionally deal with the special case of back-to-back episodes of a season pass by resolving the conflict by recording the first episode with padding followed by recording whatever remains of the body/padding of the second episode.

3.6 Live or Delayed

In an embodiment, a live recording feature is provided such that anytime a user chooses to schedule a recording of multimedia content, an associated indicator (e.g., metadata associated with the multimedia content) is checked to determine whether it is tagged as either live (e.g., "Live") or delayed (e.g., "Delayed"). For example, when the indicator is tagged as "Live", such feature may automatically cause the user to be presented with a message that suggests adding time to the end of the recording session (e.g., padding) for the multimedia content. As another example, the message may be rendered on a screen and says, "Because this program is live, it may run longer than expected. Do you want to add extra time to the end of this recording just in case?" The user may choose to ignore the message and proceed as normal (e.g., proceed with no changes to the recording time). Or, the user may, in real-time, add additional recording time, for example, by an interactive interface. For example, a user may be presented with a text entry box in which to type in a number of minutes to add to the recording time. As another example, the user may point to and select from a list of minutes with which to increase recording time, such as 1-minute, 2-minutes, and so on.

4.0 Hardware Overview

Figure 12:
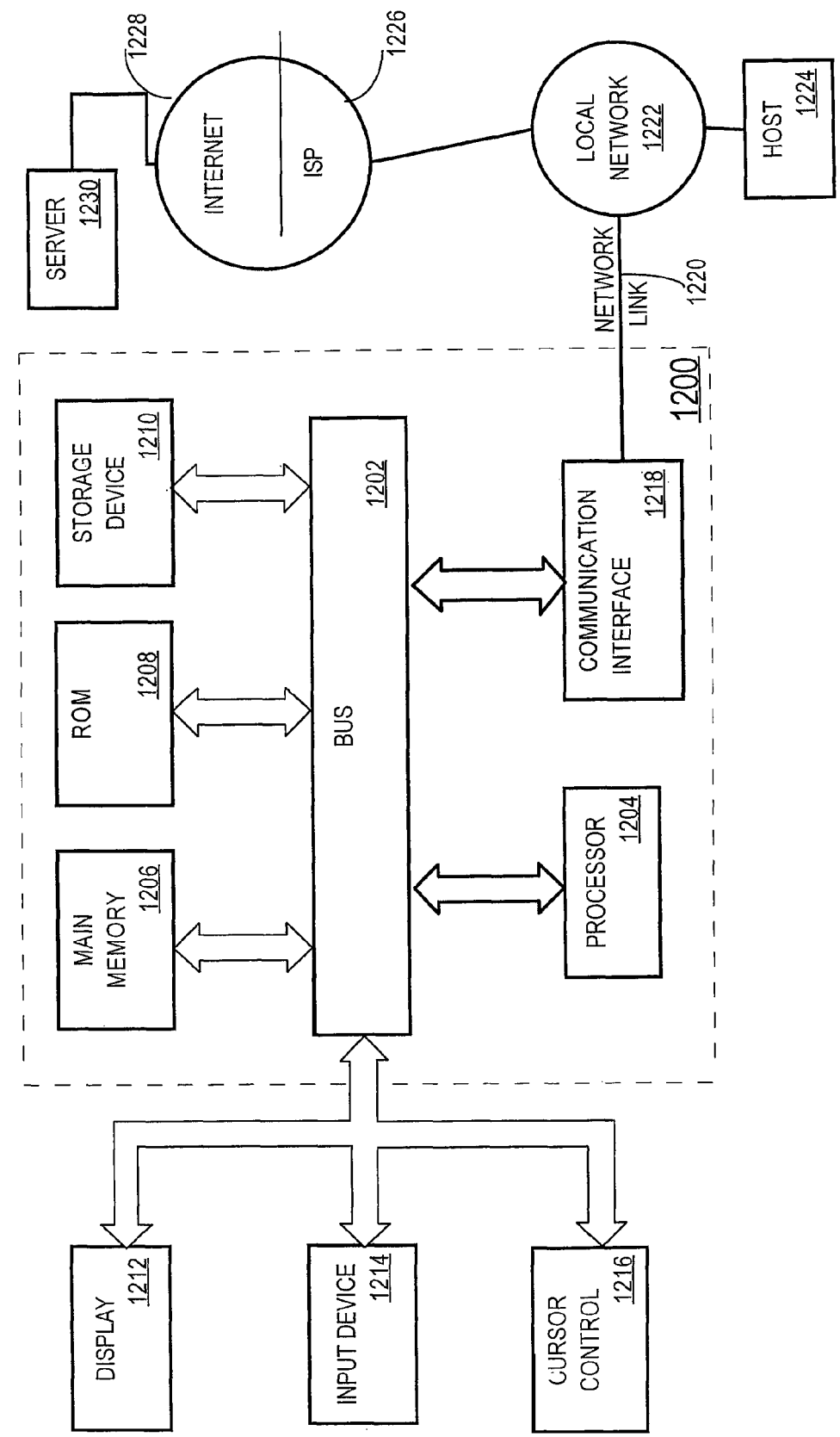
FIG. 12 is a block diagram of a system on which embodiments of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various computer/machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Thus, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, performed by a server, comprising:
   receiving, by the server, a request to record a particular multimedia content from a client device;
   creating, by the server, a first query based on the request and performing the steps of:
   searching, based on the first query, for the particular multimedia content in a broadcast database; and
   upon receiving search results from the broadcast database, the search results comprising information that the particular multimedia content was discovered in the broadcast database, sending, to the client device, a program identifier that identifies the particular multimedia content and instructions for scheduling to record the particular multimedia content;

creating, by the server, a second query based on the request and performing the steps of:
searching, based on the second query, for the particular multimedia content in a broadband database; and
upon receiving search results from the broadband database, the search results comprising information that the particular multimedia content was discovered in the broadband database, sending a URL that corresponds to the particular multimedia content or an IP address that corresponds to the particular multimedia content to the client device for downloading the particular multimedia content; and automatically adding, by the server, a wishlist entry including an identifier of the particular multimedia content to a wishlist that corresponds to the client device and sending the wishlist to the client device when the particular multimedia content was not discovered in the broadcast database and not discovered in the broadband database, the client device uses the wishlist entry for automatically recording the particular multimedia content.

2. The method as recited in claim 1, further comprising: automatically creating a wishlist that corresponds to the client device prior to adding the wishlist entry.

3. The method as recited in claim 1, wherein the instructions for scheduling to record the particular multimedia content further comprise instructions for a channel and date from which to record the particular multimedia content.

4. The method as recited in claim 1, further comprising: determining that the client device has opted-in to a service for synchronization and accessing the client device by the service.

5. The method as recited in claim 1, further comprising: sending to the client device instructions for retrieving the particular multimedia content from at least one other client device.

6. The method as recited in claim 1, further comprising: following rules that specify a particular order for performing the steps of: creating a first query and creating a second query.

7. The method as recited in claim 1, wherein adding a wishlist entry further comprises:
obtaining a program identifier that corresponds to the particular multimedia content from historical electronic program guide data, the wishlist entry comprises the program identifier , and wherein the client device uses the program identifier for automatically recording the particular multimedia content upon a subsequent showing of the particular multimedia content.

8. An apparatus, comprising:
a recording request receiver that receives a request to record a particular multimedia content from a client device;
a query subsystem that creates a first query based on the request and further comprises:
a broadcast database search subsystem that searches, based on the first query, for the particular multimedia content in a broadcast database; and
the broadcast database search subsystem, upon receiving search results from the broadcast database, the search results comprising information that the particular multimedia content was discovered in the broadcast database, sends, to the client device, a program identifier that identifies the particular multimedia content and instructions for scheduling to record the particular multimedia content;

the query subsystem creates a second query based on the request and further comprises:
a broadband database search subsystem that searches, based on the second query, for the particular multimedia content in a broadband database; and
the broadband database search subsystem, upon receiving search results from the broadband database, the search results comprising information that the particular multimedia content was discovered in the broadband database, sends a URL that corresponds to the particular multimedia content or an IP address that corresponds to the particular multimedia content to the client device for downloading the particular multimedia content; and a wishlist management subsystem that automatically adds a wishlist entry including an identifier of the particular multimedia content to a wishlist that corresponds to the client device and sends the wishlist to the client device when the particular multimedia content was not discovered in the broadcast database and not discovered in the broadband database, the client device uses the wishlist entry for automatically recording the particular multimedia content.

9. The apparatus as recited in claim 8, wherein the wishlist management subsystem automatically creates a wishlist that corresponds to the client device prior to adding the wishlist entry.

10. The apparatus as recited in claim 8, wherein the instructions for scheduling to record the particular multimedia content further comprise instructions for a channel and date from which to record the particular multimedia content.

11. The apparatus as recited in claim 8, further comprising:
a synchronization subsystem that determines that the client device has opted-in to a service for synchronization and accesses the client device by the service.

12. The apparatus as recited in claim 8, further comprising:
a download manager that sends to the client device instructions for retrieving the particular multimedia content from at least one other client device.

13. The apparatus as recited in claim 8, further comprising:
a rule manager that following rules that specify a particular order for the query subsystem to operate the broadcast database search subsystem and the broadband database search subsystem.

14. The apparatus as recited in claim 8, wherein the wishlist management subsystem further comprises:
a program identifier lookup subsystem that obtains a program identifier that corresponds to the particular multimedia content from historical electronic program guide data and wherein the wishlist entry comprises the program identifier , and wherein the client device uses the program identifier for automatically recording the particular multimedia content upon a subsequent showing of the particular multimedia content.

15. A non-transitory computer-readable medium carrying one or more sequences of instructions, which instructions, when executed by one or more processors, cause the one or more processors to carry out the steps of:
receiving a request to record a particular multimedia content from a client device;
creating a first query based on the request and performing the steps of:
searching, based on the first query, for the particular multimedia content in a broadcast database; and upon receiving search results from the broadcast database, the search results comprising information that the particular multimedia content was discovered in the broadcast database, sending, to the client device, a program identifier that identifies the particular multimedia content and instructions for scheduling to record the particular multimedia content;

creating a second query based on the request and performing the steps of:

searching, based on the second query, for the particular multimedia content in a broadband database; and upon receiving search results from the broadband database, the search results comprising information that the particular multimedia content was discovered in the broadband database, sending a URL that corresponds to the particular multimedia content or an IP address that corresponds to the multimedia particular content to the client device for downloading the particular multimedia content; and automatically adding a wishlist entry including an identifier of the particular multimedia content to a wishlist that corresponds to the client device and sending the wishlist to the client device when the particular multimedia content was not discovered in the broadcast database and not discovered in the broadband database, the client device uses the wishlist entry for automatically recording the particular multimedia content.

16. The non-transitory computer-readable medium as recited in claim 15, further comprising:

automatically creating a wishlist that corresponds to the client device prior to adding the wishlist entry.

17. The non-transitory computer-readable medium as recited in claim 15, wherein the instructions for scheduling to record the particular multimedia content further comprise instructions for a channel and date from which to record the particular multimedia content.

18. The non-transitory computer-readable medium as recited in claim 15, further comprising:

determining that the client device has opted-in to a service for synchronization and accessing the client device by the service.

19. The non-transitory computer-readable medium as recited in claim 15, further comprising:

sending to the client device instructions for retrieving the particular multimedia content from at least one other client device.

20. The non-transitory computer-readable medium as recited in claim 15, further comprising:

following rules that specify a particular order for performing the steps of: creating a first query and creating a second query.

21. The non-transitory computer-readable medium as recited in claim 15, wherein adding a wishlist entry further comprises:

obtaining a program identifier that corresponds to the particular multimedia content from historical electronic program guide data, the wishlist entry comprises the program identifier, and wherein the client device uses the program identifier for automatically recording the particular multimedia content upon a subsequent showing of the particular multimedia content.

22. A method, comprising:

receiving user input to record a particular multimedia content on a device;

sending a search request based on the user input to a service;

receiving search results based on the search request from the service;

scheduling to record the particular multimedia content when the search results comprise a program identifier that identifies the particular multimedia content and instructions for scheduling to record the particular multimedia content;

downloading the particular multimedia content when the search results comprise a URL that corresponds to the particular multimedia content or an IP address that corresponds to the particular multimedia content, the particular multimedia content is downloaded from the URL or the IP address; and automatically adding a wishlist entry including an identifier of the particular multimedia content to a wishlist, when the search results do not comprise the instructions for scheduling to record the particular multimedia content, the URL, and the IP address, and wherein the device uses the wishlist entry for automatically recording the particular multimedia content on the device.

23. The method as recited in claim 22, further comprising:

automatically creating a wishlist, prior to adding the wishlist entry.

24. The method as recited in claim 22, wherein the instructions for scheduling to record the particular multimedia content further comprise instructions for a channel and date from which to record the particular multimedia content.

25. The method as recited in claim 22, further comprising:

opting-in to the service for granting the service access for synchronization with the device.

26. The method as recited in claim 22, further comprising:

receiving from the service instructions for retrieving the particular multimedia content from at least one other device.

27. The method as recited in claim 22, further comprising:

receiving from the service one or more rules wherein the rules specify a particular order for performing the steps of: scheduling to record and downloading the particular multimedia content; or receiving user input specifying one or more rules for performing, in a particular order, the steps of: scheduling to record and downloading the particular multimedia content.

28. The method as recited in claim 22, wherein adding a wishlist entry further comprises:

receiving from the service a program identifier that corresponds to the particular multimedia content from the service's historical electronic program guide data, the wishlist entry comprises the program identifier, and wherein the device uses the program identifier for automatically recording the particular multimedia content upon a subsequent showing of the particular multimedia content.

29. An apparatus, comprising:

a user input receiver that receives user input to record a particular multimedia content on a device;

a search request subsystem that sends a search request based on the user input to a service;

a search result receiver that receives search results based on the search request from the service;

a recording scheduler that schedules to record the particular multimedia content when the search results comprise a program identifier that identifies the particular multimedia content and instructions for scheduling to record the particular multimedia content;

a content downloader that downloads the particular multimedia content when the search results comprise a URL that corresponds to the particular multimedia content or an IP address that corresponds to the particular multimedia content, the particular multimedia content is downloaded from the URL or the IP address; and a wishlist manager that automatically adds a wishlist entry including an identifier of the particular multimedia content to a wishlist, when the search results do not comprise the instructions for scheduling to record the particular multimedia content, the URL, and the IP address, and the device uses the wishlist entry for automatically recording the particular multimedia content on the device.

30. The apparatus as recited in claim 29, wherein the wishlist manager automatically creates a wishlist, prior to adding the wishlist entry.

31. The apparatus as recited in claim 29, wherein the instructions for scheduling to record the particular multimedia content further comprise instructions for a channel and date from which to record the particular multimedia content.

32. The apparatus as recited in claim 29, wherein the device opts-in to the service for granting the service access for synchronization with the device.

33. The apparatus as recited in claim 29, wherein the device receives from the service instructions for retrieving the particular multimedia content from at least one other device.

34. The apparatus as recited in claim 29, further comprising:
a rules manager that receives from the service one or more rules wherein the rules specify a particular order for performing the steps of: scheduling to record and downloading the particular multimedia content; or
a rules manager that receives user input specifying one or more rules for performing, in a particular order, the steps of: scheduling to record and downloading the particular multimedia content.

35. The apparatus as recited in claim 29, wherein the wishlist manager further comprises:
a program identifier lookup subsystem that obtains from the service a program identifier that corresponds to the particular multimedia content from the service's historical electronic program guide data, the wishlist entry comprises the program identifier, and wherein the device uses the program identifier for automatically recording the particular multimedia content upon a subsequent showing of the particular multimedia content.

36. A non-transitory computer-readable medium carrying one or more sequences of instructions, which instructions, when executed by one or more processors, cause the one or more processors to carry out the steps of:
receiving user input to record a particular multimedia content on a device;
sending a search request based on the user input to a service;
receiving search results based on the search request from the service;
scheduling to record the particular multimedia content when the search results comprise a program identifier that identifies the particular multimedia content and instructions for scheduling to record the particular multimedia content;
downloading the particular multimedia content when the search results comprise a URL that corresponds to the particular multimedia content or an IP address that corresponds to the particular multimedia content, the particular multimedia content is downloaded from the URL or the IP address; and
automatically adding a wishlist entry including an identifier of the particular multimedia content to a wishlist, when the search results do not comprise the instructions for scheduling to record the particular multimedia content, the URL, and the IP address, and the device uses the wishlist entry for automatically recording the particular multimedia content on the device.

37. The non-transitory computer-readable medium as recited in claim 36, further comprising:
automatically creating a wishlist, prior to adding the wishlist entry.

38. The non-transitory computer-readable medium as recited in claim 36, wherein the instructions for scheduling to record the particular multimedia content further comprise instructions for a channel and date from which to record the particular multimedia content.

39. The non-transitory computer-readable medium as recited in claim 36, further comprising:
opting-in to the service for granting the service access for synchronization with the device.

40. The non-transitory computer-readable medium as recited in claim 36, further comprising:
receiving from the service instructions for retrieving the particular multimedia content from at least one other device.

41. The non-transitory computer-readable medium as recited in claim 36, further comprising:
receiving from the service one or more rules wherein the rules specify a particular order for performing the steps of: scheduling to record and downloading the particular multimedia content; or
receiving user input specifying one or more rules for performing, in a particular order, the steps of: scheduling to record and downloading the particular multimedia content.

42. The non-transitory computer-readable medium as recited in claim 36, wherein adding a wishlist entry further comprises:
receiving from the service a program identifier that corresponds to the particular multimedia content from the service's historical electronic program guide data, the wishlist entry comprises the program identifier, and wherein the device uses the program identifier for automatically recording the particular multimedia content upon a subsequent showing of the particular multimedia content.

43. The method of claim 1, wherein the identifier of the particular multimedia content is a program identifier.

44. The method of claim 1, wherein the identifier of the particular multimedia content is an actor identifier that identifies an actor associated with the particular multimedia content.

* * * * *